United States Patent
Miyazaki et al.

(10) Patent No.: US 8,483,896 B2
(45) Date of Patent: Jul. 9, 2013

(54) MOTOR CONTROL DEVICE AND MOTOR SYSTEM EQUIPPED WITH MOTOR CONTROL DEVICE

(75) Inventors: Hideki Miyazaki, Hitachi (JP); Hiroyuki Yamada, Hitachinaka (JP); Kimihisa Furukawa, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 356 days.

(21) Appl. No.: 12/847,816

(22) Filed: Jul. 30, 2010

(65) Prior Publication Data

US 2011/0029179 A1 Feb. 3, 2011

(30) Foreign Application Priority Data

Jul. 31, 2009 (JP) .................. 2009-178579

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |

(52) U.S. Cl.
USPC ........................................ 701/22

(58) Field of Classification Search
USPC ............................................ 701/22
See application file for complete search history.

(56) References Cited

FOREIGN PATENT DOCUMENTS

| | | |
|---|---|---|
| JP | 63-77397 A | 4/1988 |
| JP | 9-47055 A | 2/1997 |
| JP | 2004-336844 A | 11/2004 |
| JP | 2006-42416 A | 2/2006 |
| WO | PCT/JP/2006/317687 | * 8/2006 |

OTHER PUBLICATIONS

Machine translation of PCT/JP/2006/317687.*
Japanese Office Action including partial English translation dated Dec. 13, 2011 (Eight (8) pages).

* cited by examiner

*Primary Examiner* — Mary Cheung
*Assistant Examiner* — Frederick Brushaber
(74) *Attorney, Agent, or Firm* — Crowell & Moring LLP

(57) ABSTRACT

A motor control device includes: an electric circuit that supplies power, which is supplied from a power source and controlled by the electric circuit, to a motor; and a control circuit that generates a command signal to be used to control operation of the electric circuit, wherein: the control circuit generates the command signal so as to intermittently turn off power supply to the motor while the motor is being driven with power supplied to the motor and controls operation of the electric circuit based upon the command signal thus generated.

6 Claims, 9 Drawing Sheets

MOTOR CONTROL DEVICE AND MOTOR SYSTEM EQUIPPED WITH MOTOR CONTROL DEVICE

INCORPORATION BY REFERENCE

The disclosure of the following priority application is herein incorporated by reference: Japanese Patent Application No. 2009-178579 filed Jul. 31, 2009.

BACKGROUND OF THE INVENTION

1. Field of the Invention

The present invention relates to a motor control device and a motor system equipped with the motor control device.

2. Description of Related Art

The background art related to a system equipped with motors used as drive sources is disclosed, for instance in Japanese Laid Open Patent Publications H9-47055 and 2006-42416.

Japanese Laid Open Patent Publication H9-47055 discloses a technology whereby the power supply from an inverter to a permanent magnet synchronous motor operating under field-weakening control is stopped by shorting input terminals of the permanent magnet synchronous motor if an anomaly occurs as a main switch located between the main battery and the inverter enters an open state, so as to ensure that a voltage at a level equal to or higher than the required level is not applied to a smoothing capacitor connected to the DC input side of the inverter switching unit. Input terminals of the permanent magnet synchronous motor are shorted by turning on all the upper arms or all the lower arms in the inverter switching unit.

Japanese Laid Open Patent Publication 2006-42416 discloses a technology whereby a system main relay, disposed between a battery and an inverter to electrically connect them or electrically disconnect them from each other, is turned off when the voltage due to a back electromotive force generated at a motor becomes higher than the voltage on the battery side.

SUMMARY OF THE INVENTION

The interest in and the activity of introducing the so-called electromotive drive systems equipped with motors used as drive sources, by which the environmental load is alleviated and the global environmental protection is intended, have been increasing steadily in recent years. Especially over the past several years, the issue of global warming has become a more serious concern and social awareness of the need for more rigorous regulation of emission of greenhouse gases (e.g., carbon dioxide) continues to increase. Through motor-driven systems such as that disclosed in Japanese Laid Open Patent Publications H9-47055 and 2006-42416, proposed as a means for addressing these social issues, attempts are made to assure even higher levels of efficiency in motor operation and further reduce any inefficient energy consumption attributable to the motors, so as to assure better energy saving in these systems.

According to the 1st aspect of the present invention, a motor control device comprises: an electric circuit that supplies power, which is supplied from a power source and controlled by the electric circuit, to a motor; and a control circuit that generates a command signal to be used to control operation of the electric circuit, wherein: the control circuit generates the command signal so as to intermittently turn off power supply to the motor while the motor is being driven with power supplied to the motor and controls operation of the electric circuit based upon the command signal thus generated.

According to the 2nd aspect of the present invention, a motor control device comprises: an electric circuit that supplies power, which is supplied from a power source and controlled by the electric circuit, to a motor; and a control circuit that generates a command signal to be used to control operation of the electric circuit, wherein: the control circuit generates the command signal so as to intermittently cut off power containing an ineffective current component while the motor is being driven with the power containing the ineffective current component supplied to the motor to keep down an induced voltage at the motor after the induced voltage at the motor becomes higher than a voltage at the power source, and controls the operation of the electric circuit based upon the command signal thus generated.

According to the 3rd aspect of the present invention, in a motor control device according to the 1st aspect, it is preferred that the electric circuit is a switching circuit that converts DC power to AC power by engaging a plurality of switching semiconductor elements in switching operation, constituted with a plurality of serial circuits each formed by electrically connecting in series an upper-arm switching semiconductor element and a lower-arm switching semiconductor element, which are electrically connected in parallel to the power source; the motor includes a plurality of input terminals through which the AC power is input; the plurality of serial circuits are disposed in a quantity corresponding to the quantity of the plurality of input terminals; a middle point between the upper-arm switching semiconductor element and the lower-arm switching semiconductor element in each of the plurality of serial circuits is electrically connected to a corresponding input terminal among the plurality of input terminals; and the power is cut off by setting all upper-arm switching semiconductor elements or all lower-arm switching semiconductor elements in the plurality of serial circuits in an electrically continuous state at once and thus setting the plurality of input terminals in an electrically shorted state.

According to the 4th aspect of the present invention, in a motor control device according to the 3rd aspect, it is preferred that control modes assumed by the control circuit include; a first control mode in which controls are done for operation of the electric circuit so that the plurality of input terminals are set in a electrically shorted state; and a second control mode in which controls are done for operation of the electric circuit so that a drive force output from the motor is first briefly decreased and then increased; and the first control mode and the second control mode are alternately switched, when the power is intermittently turned off.

According to the 5th aspect of the present invention, in a motor control device according to the 3rd aspect, it is preferred that the power is cut off by forming a first control mode in which controls are done for operation of the electric circuit so that the plurality of input terminals are set in an electrically shorted state by setting all upper-arm switching semiconductor elements or all lower-arm switching semiconductor elements in the plurality of serial circuits in a electrically continuous state with predetermined electrical angle timing relative to a single cycle of an AC current output from the electric circuit; and a second control mode, in which controls are done for operation of the power conversion circuit is formed, wherein a switching semiconductor element of an arm which is different from a switching semiconductor element of other serial circuits and of being in an electrically continuous state is set in an electrically continuous state according to an predetermined order of serial circuits, and wherein an amplitude of AC current output from the electric circuit is modified in correspondence to a length of time of the electrically continuous state, and the first control mode and the second control mode are alternately assumed.

According to the 6th aspect of the present invention, in a motor control device according to the 3rd aspect, it is preferred that, when the shorted state is sustained over a length of time equal to or greater than a single cycle of AC current output from the electric circuit, upper-arm switching semiconductor elements or lower-arm switching semiconductor elements are set in an electrically continuous state after each interruption in an alternating pattern.

According to the 7th aspect of the present invention, a motor control device comprises: a power conversion circuit that converts DC power supplied from a battery to AC power by engaging a plurality of switching semiconductor elements in switching operation and supplies the AC power resulting from conversion to a permanent magnet field synchronous motor functioning as a drive source for a vehicle; and a control circuit that generates, based upon a requested torque command value for the permanent magnet field synchronous motor, a switching command signal to be used for switching operation control of the plurality of switching semiconductor elements, and outputs the switching command signal thus generated to the power conversion circuit, wherein: while the permanent magnet field synchronous motor is being driven with power containing a field-weakening current component supplied thereto for suppressing a field magnetic flux formed via a permanent magnet in the permanent magnet field synchronous motor after an induced voltage generated at the permanent magnet field synchronous motor becomes higher than a voltage at the battery in a vehicle traveling on a drive force imparted from the permanent magnet field synchronous motor, the control circuit generates the switching command signal so as to intermittently cut off the power containing a field-weakening current component and controls the switching operation of the plurality of switching semiconductor elements based upon the switching command signal thus generated.

According to the 8th aspect of the present invention, in a motor control device according to the 7th aspect, it is preferred that the power conversion circuit is constituted with a plurality of serial circuits, each formed by electrically connecting in series the upper-arm switching semiconductor element and the lower-arm switching semiconductor element, which are electrically connected in parallel to the battery; the plurality of serial circuits are disposed in a quantity corresponding to a number of phases assumed for armature windings in the permanent magnet field synchronous motor, to which AC power output from the power conversion circuit is input; a middle point between the upper-arm switching semiconductor element and the lower-arm switching semiconductor element in each of the plurality of serial circuits is electrically connected to the armature winding in a corresponding phase; and when the power is cut off, by setting all upper-arm switching semiconductor elements or all lower-arm switching semiconductor elements in the plurality of serial circuits in an electrically continuous state at once, a state in which a circulating current flows between the power conversion circuit and the armature windings is thus created.

According to the 9th aspect of the present invention, in a motor control device according to the 8th aspect, it is preferred that control modes assumed by the control circuit include: a first control mode in which the electric circuit operation is controlled so as to create a state in which a circulating current flows between the power conversion circuit and the armature windings; and a second control mode in which the electric circuit operation is controlled so that a drive force output from the permanent magnet field synchronous motor is first briefly decreased and then increased; and the power containing a field-weakening current component is intermittently cut off by alternately switching to the first control mode and the second control mode.

According to the 10th aspect of the present invention, in a motor control device according to the 8th aspect, it is preferred that the power is cut off by forming a first control mode in which controls are done for operation of the electric circuit so that a state in which a circulating current flows between the power conversion circuit and the armature windings is created by setting all upper-arm switching semiconductor elements or all lower-arm switching semiconductor elements in the plurality of serial circuits in a electrically continuous state at once with predetermined electrical angle timing relative to a single cycle of an AC current output from the power conversion circuit; and a second control mode, in which controls are done for operation of the power conversion circuit is formed, wherein, among upper- and lower-arm switching semiconductor elements in one of the plurality of serial circuits, a switching semiconductor element of an arm which is different from a switching semiconductor element of other serial circuits and of being in an electrically continuous state is set in an electrically continuous state according to an predetermined order of phases of the armature windings, and wherein an amplitude of AC current output from the power conversion circuit is modified in correspondence to a length of time of the electrically continuous state, and the first control mode and the second control mode are alternately assumed.

According to the 11th aspect of the present invention, in a motor control device according to the 8th aspect, it is preferred that, when the state in which a circulating current flow is sustained over a length of time equal to or greater than a single cycle of the AC current output from the power conversion circuit, upper-arm switching semiconductor elements or lower-arm switching semiconductor elements are set in an electrically continuous state after each intermittence in an alternating pattern.

According to the 12th aspect of the present invention, a motor system comprises: a motor that is driven on power supplied thereto and generates a drive force to be used to drive a drive target body; and a control device that controls drive of the motor by controlling and supplying a power, which is supplied from a power source of the motor and is controlled by the control device, to the motor, wherein: the control device intermittently interrupts the drive power supply to the motor while driving the motor by supplying the drive power to the motor.

According to the 13th aspect of the present invention, a motor system comprises; a motor that is driven on drive power supplied thereto and generates a drive force to be used to drive a drive target body; and a control device that controls drive of the motor by controlling and supplying a power, which is supplied from a power source of the motor, to the motor, wherein: the control device intermittently interrupts a supply of power containing an ineffective current component while driving the motor by supplying the power containing the ineffective current component to the motor to suppress an induced voltage at the motor once a induced voltage at the motor becomes higher than a voltage at the power source.

According to the 14th aspect of the present invention, in a motor system according to the 12th aspect, it is preferred that the control device converts DC power to AC power by engaging a plurality of switching semiconductor elements in switching operation, and comprises a switching circuit constituted with a plurality of serial circuits each formed by electrically connecting in series an upper-arm switching semiconductor element and a lower-arm switching semiconductor element, which are electrically connected in parallel to the power source; the motor includes a plurality of input terminals through which the AC power is input; the plurality of serial circuits are disposed in a quantity corresponding to a quantity of the plurality of input terminals; a middle point between the upper-arm switching semiconductor element and the lower-arm switching semiconductor element in each of the plurality of serial circuits is electrically connected to a corresponding input terminal among the plurality of input terminals; and the power is cut off by setting all upper-arm switching semiconductor elements or all lower-arm switching semiconductor elements in the plurality of serial circuits in an electrically continuous state at once and thus setting the plurality of input terminals in an electrically shorted state.

According to the 15th aspect of the present invention, in a motor system according to the 14th aspect, it is preferred that a first operation mode for cutting off drive power supplied to the motor by electrically shorting a plurality of input terminals at the motor; and a second operation mode in which the motor is engaged in operation so that a drive force output from the motor is first briefly decreased and is then increased, wherein: the first operation mode and the second operation mode are alternately assumed in an operation range over which the motor is driven by intermittently cutting off the drive power.

According to the 16th aspect of the present invention, in a motor system according to the 14th aspect, it is preferred that the drive power supplied to the motor is cut off by forming a first operation mode, in which the plurality of input terminals of the motor are in an electrically shorted state by setting all upper-arm switching semiconductor elements or all lower-arm switching semiconductor elements in the plurality of serial circuits in an electrically continuous state at once with predetermined electrical angle timing relative to a single cycle of an AC current output from the control device; and a second control mode, in which controls are done for operation of the power conversion circuit, is formed, wherein, among upper- and lower-arm switching semiconductor elements in one of the plurality of serial circuits, a switching semiconductor element of an arm which is different from a switching semiconductor element of other serial circuits and of being in an electrically continuous state is set in an electrically continuous state according to an predetermined order of serial circuits, and wherein an amplitude of AC current output from the control device is modified in correspondence to a length of time of the electrically continuous state, and the first control mode and the second control mode are alternately assumed.

According to the 17th aspect of the present invention, in a motor system according to 16th aspect, it is preferred that, when the shorted state is sustained over a length of time equal to or greater than a single cycle of the AC current output from the control device, upper-arm switching semiconductor elements or lower-arm switching semiconductor elements are set in an electrically continuous state after each intermittence in an alternating pattern.

According to the 18th aspect of the present invention, a motor system comprises: a permanent magnet field synchronous motor installed in a vehicle and used as a drive source for a vehicle; and an inverter device that converts DC power supplied from a battery, which is installed in a vehicle and functions as a drive power source for the permanent magnet field synchronous motor, to AC power and controls drive of the permanent magnet field synchronous motor by supplying the AC power resulting from conversion to the permanent magnet field synchronous motor where the AC power is used as drive power for the permanent magnet field synchronous motor, wherein: the inverter device comprises: a power conversion circuit that includes a plurality of switching semiconductor elements and converts the DC power to the AC power by engaging the plurality of switching semiconductor elements in switching operation; and a control circuit that generates, based upon a requested torque command value for the permanent magnet field synchronous motor, a switching command signal to be used for switching operation control of the plurality of switching semiconductor elements and outputs the switching command signal thus generated to the power conversion circuit; and while the permanent magnet field synchronous motor is being driven with power containing a field-weakening current component supplied thereto for suppressing a field magnetic flux formed via a permanent magnet in the permanent magnet field synchronous motor, after an induced voltage generated at the permanent magnet field synchronous motor becomes higher than a voltage at the battery in a vehicle traveling on a drive force imparted from the permanent magnet field synchronous motor, a power containing the field-weakening current component is intermittently cut off through operation of the inverter device.

According to the 19th aspect of the present invention, in a motor system according to the 18th aspect, it is preferred that the power conversion circuit is constituted with a plurality of serial circuits, each formed by electrically connecting in series the upper-arm switching semiconductor element and the lower-arm switching semiconductor element, which are electrically connected in parallel to the battery; the plurality of serial circuits are disposed in a quantity corresponding to a number of phases assumed for armature windings in the permanent magnet field synchronous motor, to which AC power output from the power conversion circuit is input; a middle point between the upper-arm switching semiconductor element and the lower-arm switching semiconductor element in each of the plurality of serial circuits is electrically connected to an armature winding in a corresponding phase; and when the power is cut off, by setting all upper-arm switching semiconductor elements or all lower-arm switching semiconductor elements in the plurality of serial circuits in an electrically continuous state at once, a state in which a circulating current flows between the power conversion circuit and the armature windings is thus created.

According to the 20th aspect of the present invention, in a motor system according to the 19th aspect, it assumes a first operation mode in which a drive power supplied to the motor is cut off by allowing a circulating current to flow between the power conversion circuit and the armature windings; and a second operation mode in which the permanent magnet field synchronous motor is engaged in operation so that a drive force output from the permanent magnet field synchronous motor is first briefly decreased and then increased, wherein: the first operation mode and the second operation mode are alternately assumed in an operation range over which the permanent magnet field synchronous motor is driven by intermittently cutting off a power containing the field-weakening component.

According to the 21st aspect of the present invention, in a motor system according to the 19th aspect, it is preferred that a drive power supplied to the motor is cut off by forming a first operation mode in which a circulating current is allowed to flow between the power conversion circuit and the armature windings by setting all upper-arm switching semiconductor elements or all lower-arm switching semiconductor elements in the plurality of serial circuits in the electrically continuous state at once with predetermined electrical angle timing relative to a single cycle of an AC current output from the power conversion circuit; and a second operation mode, in which an electrically continuous state is achieved at either the upper-arm switching semiconductor element or the lower-arm switching semiconductor element in a specific serial circuit among the plurality of serial circuits, taking turns in a sequence matching a predetermined order assumed for the phases of the armature windings, with the upper-arm switching semiconductor element or the lower-arm switching semiconductor element thus set in an electrically continuous state located on a side opposite from switching semiconductor elements assuming an electrically continuous state in remaining serial circuits, and an amplitude of the AC current output from the power conversion circuit is adjusted in correspondence to a length of time over which these electrically continuous states are sustained, is formed, and the first operation mode and the second operation mode are alternately assumed.

According to the 22nd aspect of the present invention, in a motor system according to the 21st aspect, it is preferred that, when the state in which a circulating current flow is sustained over a length of time equal to or greater than a single cycle of the AC current output from the power conversion circuit, upper-arm switching semiconductor elements or lower-arm switching semiconductor elements are set in an electrically continuous state after each intermittence in an alternating pattern.

According to the 23rd aspect of the present invention, in a motor system according to the 21st aspect, it is preferred that a period of time, over which the state in which a circulating current is allowed to flow is sustained for a length of time equal to or greater than a single cycle of AC current output from the power conversion circuit, is intermittently formed based upon at least one of topographical information indicating a slope of a road surface upon which a vehicle is traveling and a road distance over which a vehicle travels, information obtained based upon an accelerator operation performed by a driver and information related to a torque and a rotation rate at the motor.

According to the 24th aspect of the present invention, in a motor system according to the 23rd aspect, it is preferred that an information obtained based upon the accelerator operation performed by a driver indicates a value determined based upon a pressing amount on the accelerator and a in the pressing amount; and a state related to a torque and a rotation rate at the motor is determined based upon a ratio of an Iq component and an Id component resulting from two-phase conversion of currents at the motor.

According to the 25th aspect of the present invention, a vehicle drive system comprises: a motor installed in a vehicle and used as a drive source for the vehicle; and an inverter device that converts DC power supplied from a battery to AC power and controls drive of the motor by supplying the AC power resulting from conversion to the motor as a drive power for the motor, wherein: a vehicle is engaged in traveling operation by determining a length of time over which the vehicle travels by coasting under control executed based upon at least one of topographical information indicating a slope of a road surface upon which the vehicle is traveling and a road distance over which the vehicle travels, information obtained based upon an accelerator operation performed by a driver and information related to a torque and a rotation rate at the motor, so as to set a torque at the motor to zero during the vehicle traveling operation and by alternately assuming a coasting state and an accelerating state in the vehicle.

According to the 26th aspect of the present invention, in a vehicle drive system according to the 25th aspect, it is preferred that an information obtained based upon the accelerator operation performed by a driver indicates a value determined based upon a pressing amount on the accelerator and an extent of change in the pressing amount; and a state related to a torque and a rotation rate at the motor is determined based upon a ratio of an Iq component and an Id component resulting from two-phase conversion of currents at the motor.

According to the 27th aspect of the present invention, in a vehicle drive system according to the 25th aspect, it is preferred that a vehicle is engaged in traveling operation in a coasting state based upon results of an advance operation performed by a driver.

DESCRIPTION OF THE PREFERRED EMBODIMENTS

Figure 1:
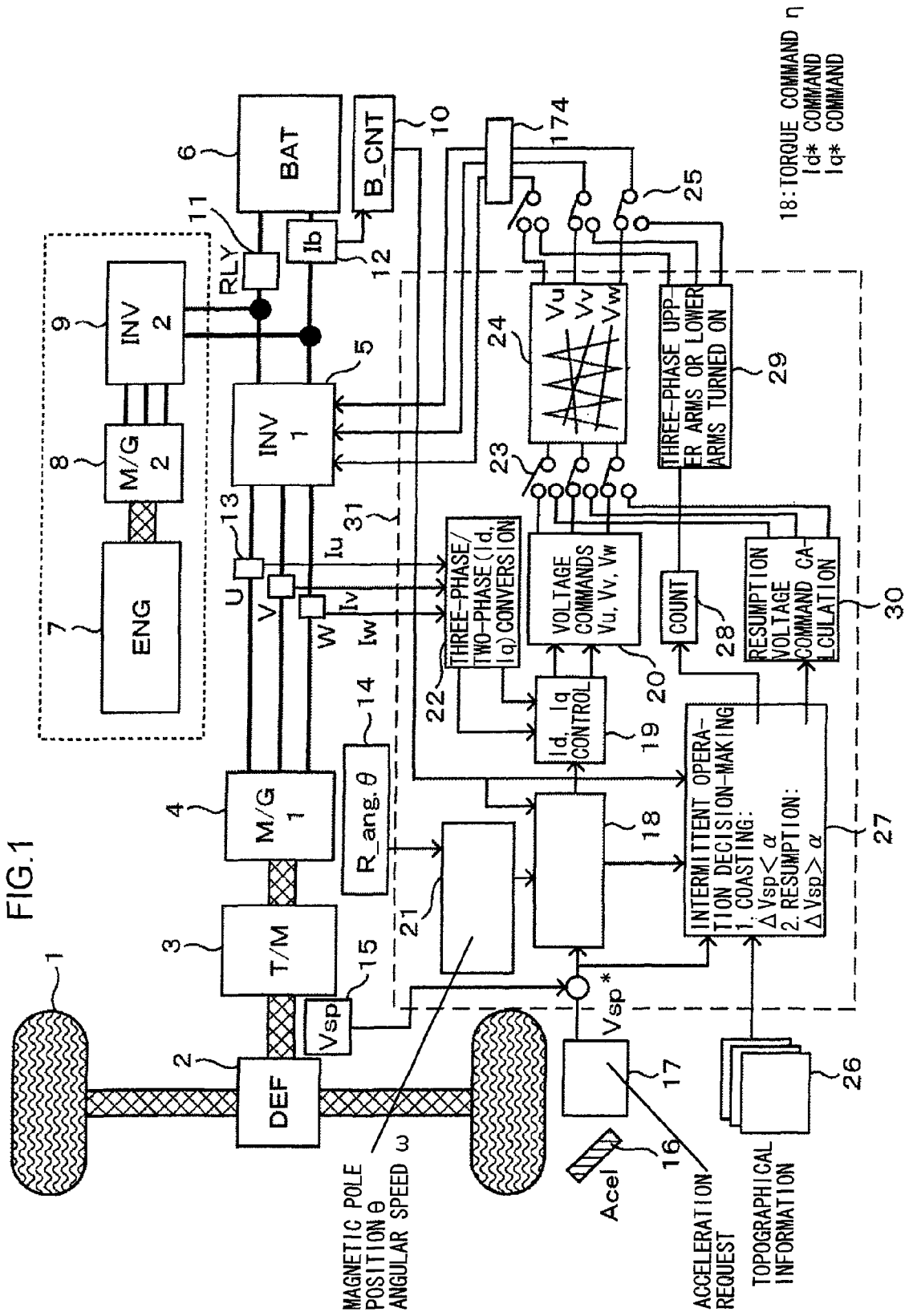
FIG. 1 is a block diagram showing the structure adopted in the vehicle drive electro-mechanical system achieved in an embodiment of the present invention.

The following is a description of an embodiment of the present invention.

In the embodiment described below, the present invention is adopted in a generator drive system for a vehicle equipped with a series hybrid drive system.

A series hybrid drive system adopts a structure that achieves a serial energy flow from the engine through the drive wheels as a dynamo electric generator is driven with the rotational motive power of an internal combustion engine, a motor generator is driven with electrical power generated through the drive of the dynamo electric generator and the drive wheels are driven with rotational motive power generated through the drive of the motor generator.

A hybrid drive system may instead adopt a parallel hybrid structure that allows the drive wheels to be driven with the rotational motive power from the internal combustion engine, the drive wheels to be driven with the rotational motive power from the motor generator and the drive wheels to be driven with both the rotational motive power from the engine and the rotational motive power from the motor generator by disposing the engine and the motor generator parallel, in terms of energy flow, to the drive wheels (by mechanically connecting (structurally), the engine and motor generator in series via a clutch functioning as a motive power transmission control mechanism) or a series/parallel hybrid structure achieved by incorporating the parallel hybrid structure and the series hybrid structure mentioned earlier (which includes two motor generators mechanically connected with the engine via a motive power transmission mechanisms such as a planetary gear mechanism, so as to enable a power generation motor generator to generate power with part of the rotational motive power from the engine distributed thereto and drive a drive motor generator with the electrical power thus obtained).

The structure assumed in the embodiment to be described below may also be adopted in a motor generator drive system in a vehicle equipped with either type of hybrid drive system.

The embodiment may be adopted in conjunction with a hybrid vehicle equipped with the hybrid drive system, a hybrid bus (public transportation vehicle), a hybrid truck (freight vehicle), a railway vehicle such as a hybrid electric train, a forklift truck for lifting/lowering loads, a specialty vehicle engaged in civil engineering work or construction work and having devices used in civil engineering work or construction work mounted thereupon, and the like.

The embodiment is described by assuming that the present invention is adopted in a hybrid vehicle among the various types of vehicles listed above and that the hybrid vehicle is equipped with a series hybrid drive system.

In addition, the structure assumed in the embodiment described below may be adopted in a motor generator drive system for a pure electric vehicle equipped with a drive system that uses electric motive force as its sole motive power source.

Furthermore, the structure assumed in the embodiment described below may be adopted in a motor drive system other than a vehicle motor generator drive system, such as an industrial motor drive system used to drive, for instance, factory equipment or a home appliance motor drive system used to drive a home electrical appliance. The present invention will be particularly ideal when adopted in a drive system for a dynamo electric machine that generates a magnetic field via a permanent magnet.

The increasing popularity of hybrid vehicles equipped with dual vehicle motive power sources, i.e., an engine and a motor generator, and pure electric vehicles equipped with a motor used as the sole vehicle motive power source raises the hope for realizing a more environmentally friendly society. Over the past several years, the issue of global warming has proved to be a serious concern and social awareness of the need for more rigorous regulation of emission of greenhouse gases (e.g., carbon dioxide) continues to increase. Reflecting these recent developments, further popularization of hybrid vehicles and pure electric vehicles equipped with energy efficient drive systems assuring higher efficiency and capable of minimizing any wasteful battery power consumption is now being aggressively pursued.

A hybrid vehicle equipped with a drive system adopting the series method is engaged in traveling operation by driving the generator with the rotational motive power originating from the engine, charging the battery with DC power generated through the drive of the generator, supplying DC power from the charged battery to an inverter device and converting the DC power to AC power, and then supplying the AC power resulting from the conversion to the motor generator to drive the motor generator. This means that the motor generator is engaged in operation through the full range of vehicle driving situations including vehicle startup, acceleration, cruising, deceleration and braking. Thus, it is crucial to realize a highly efficient drive system with minimum power loss. Similar needs must be fulfilled in the drive system for the pure electric vehicle equipped with a battery, which is charged with power provided by plugging into a regular power outlet, or charged with a high-speed charger available at a power station, and a motor generator driven with the power supplied from the battery to engage the vehicle in full-time traveling operation.

A permanent magnet synchronous motor capable of outputting a drive torque generated by combining torque generated via a permanent magnet and reluctance torque (torque generated as a magnetic flux passing through the rotor becomes locally undulated) and in particular, a synchronous motor with the permanent magnet embedded within the rotor core thereof (hereafter referred to as an "IPM"), is often used in the drive system for a hybrid vehicle or a pure electric vehicle. An IPM, enabling highly efficient drive in the low speed range and the intermediate speed range of the vehicle, fulfills the needs described above. However, as the vehicle enters the high traveling speed range, the level of induced voltage generated via the permanent magnet rises, giving rise to the challenge that it becomes increasingly difficult to assure smooth current flow as the difference between the battery voltage and the induced voltage becomes smaller. For this reason, when driving the IPM in the vehicle high speed range, phase control referred to as field-weakening control (control under which the phase of the voltage applied to the IPM is advanced relative to the induced voltage) is executed so as to suppress the induced voltage.

Under the field-weakening control, an ineffective current, which does not contribute to the drive force, is supplied to the IPM. This means that when the field-weakening control is executed, the system efficiency is lowered and also the power needed to supply the unused power must be wastefully drawn from the battery. For this reason, it is desirable to keep down the level of ineffective current consumption necessitated by the field-weakening control in a drive system equipped with an IPM by disallowing continuous drive of the IPM while the vehicle is in a high-speed cruising state, so as to realize an energy efficient system capable of assuring high efficiency and minimizing wasteful consumption of battery power.

Accordingly, in the embodiment described below, a period of time during which the power supply from the battery to the IPM is turned off is intermittently created via the inverter device, as the IPM is driven by supplying drive power containing an ineffective current component to the IPM so as to keep down the induced voltage at the IPM while the level of the induced voltage at the IPM becomes higher than the level of the battery voltage in the hybrid vehicle in a high speed cruising state. Thus, a coasting operation whereby the vehicle travels with controlling the drive of the IPM so as to output no motor torque from the IPM, is executed intermittently. Through these measures, the consumption of drive power containing the ineffective current component during the field-weakening control can be minimized. Consequently, through the embodiment described below, an energy efficient system capable of assuring high efficiency and minimizing wasteful consumption of battery power is provided.

The power supply from the battery to the IPM can be turned off by executing three-phase shorting control under which the switching semiconductor elements assumed for the upper arms or the lower arms in all the phases assumed in the inverter device are turned on at once. While no motor torque is generated as the vehicle travels in a coasting state under the three-phase shorting control, the shorting current causes a winding resistance loss at the motor and the temperatures at the IPM and the inverter device rise due to exothermic loss. However, through the embodiment described below, in which the three-phase shorting control is executed intermittently, the occurrence of loss is minimized and also the extent to which the temperatures at the IPM and the inverter device rise due to exothermic loss is minimized. In addition, while a braking force is generated at the IPM under three-phase shorting control, the three-phase shorting control in the embodiment is executed intermittently as described below so as to minimize the adverse effect of the braking force on the traveling condition of the hybrid vehicle.

Alternatively, the power supply from the battery to the IPM may be turned off by disconnecting a relay disposed between the battery and the inverter device. Through this method, the hybrid vehicle can be engaged in traveling operation in a coasting state with the motor torque reduced to zero. Furthermore, while in the three-phase shorting there flows a shorting (circulating) current at the IPM, no such current flows with this alternative method, and thus, no loss occurs or the temperatures at the IPM and the inverter device do not rise due to the exothermic loss. The speed of the hybrid vehicle in the coasting state becomes reduced due to traveling resistance or the friction at the road surface. For this reason, upon exiting the coasting state, the hybrid vehicle may need to be re-accelerated. However, even if the relay is turned on in order to quickly accelerate the hybrid vehicle in the zero motor torque state by increasing the motor current from zero to a predetermined level, it takes a significant length of time to raise the motor current and thus, a time lag occurs. In other words, the issue of delay in response must be addressed when the power supply is turned off by disconnecting the relay. The response is a crucial indicator used to evaluate the performance of a vehicle and any risk of poor response must be addressed. However, three-phase shorting is achieved in the embodiment described above by controlling the switching operation at the inverter device to turn off the power supply from the battery to the IPM. Thus, since no relay needs to be disconnected in order to turn off the power supply, there is no delay in response. In addition, when the power supply is turned off by disconnecting the relay, a surge or an arc tends to occur as the contact point is switched, and as the relay is engaged frequently, the service life of the contact point is bound to be shortened. However, such concerns can be eliminated by adopting the embodiment to be described below.

Under the intermittent control achieved by controlling the switching operation at the inverter device, a first control mode, in which the current supplied from the battery to the IPM is cut off through three-phase shorting at the inverter device, and a second control mode, in which the motor current is controlled so that the torque output from the IPM is temporarily suppressed and then increased, are alternately selected multiple times, so as to intermittently create a time period during which the power supply from the battery to the IPM is turned off. Through these measures, the extent of torque fluctuation occurring as the vehicle in the coasting state reverts into an accelerating state can be minimized.

In addition, the power supply from the battery to the IPM is turned off by creating a three-phase shorting mode in which the switching semiconductor elements for the upper arms or the lower arms in all the phases are turned on at once with predetermined electrical angle timing in a single cycle of AC current output from the inverter device in the embodiment to be described below. Furthermore, a single-phase control mode, in which the switching semiconductor element for the upper arm or the lower arm in a specific phase, distinct from the upper arms or the lower arms in the other two phases, is turned on at the inverter device providing a single-phase output corresponding to a specific phase selected in a predetermined phase order and the amplitude of the AC current output from the inverter device is modified based upon the length of time over which the switching semiconductor element remains in the ON state is created, and the operation is alternately switched to the three-phase shorting mode and the single-phase control mode.

In addition, in the embodiment described below, a period of time during which the three-phase shorting mode is sustained for a length of time equal to or greater than a single cycle of AC current output from the inverter device is intermittently created based upon at least one of topographical information including the slope of the road surface and the road distance, information on an accelerator operation performed by the driver and a condition related to the IPM torque and the IPM rotational speed.

In the embodiment to be described below, switching semiconductor elements in the upper arms or in the lower arms of all the phases are alternately switched on, each time the inverter device, following an interval, enters the three-phase shorting mode, which is sustained over a length of time equal to or greater than a single cycle of the AC current output from the inverter device.

In the embodiment to be described below, the length of time over which the vehicle is to be engaged in coasting operation, by which the torque at the IPM in the traveling vehicle is set to zero, is determined based upon at least one of topographical information including the slope of the road surface and the road distance, information on an accelerator operation performed by the driver and a condition related to the IPM torque and the IPM rotational speed. Thus, the vehicle travels by alternately switching to the coasting state or the accelerating state. The coasting operation may be executed based upon the results of an advance operation performed by the driver.

The information on the accelerator operation performed by the driver is obtained based upon the amount of pressing on the accelerator, and the extent to which the amount of pressing has changed.

The condition related to the torque and the rotation rate at the IPM is identified based upon the ratio of an Iq component and an Id component resulting from two-phase conversion of the IPM currents.

Through the embodiment to be described below, in which the period of time during which the torque at the IPM is turned off is created intermittently, an energy efficient system capable of assuring high efficiency and minimizing wasteful consumption of battery power can be realized. In addition, in the embodiment, the extent of loss at the IPM can be kept down based upon the ratio of the interruption, a shorting current is circulated in the IPM in the three-phase shorting mode and once the vehicle enters an accelerating state, the current at the IPM, at the shorting current value, can be adjusted to a value corresponding to the torque to be output with a high level of responsiveness. Moreover, in the embodiment, as the vehicle in a coasting state reenters an accelerating state, the extent of torque fluctuation is minimized and immediately after the reentry to the accelerating state, the torque can be controlled so as to achieve the level requested by the driver with a high level of responsiveness.

Next, in reference to drawings, the embodiment of the present invention is described in more specific terms.

First, the structure adopted in the drive system for the hybrid vehicle is described in reference to FIG. 1.

The hybrid electric vehicle (hereafter referred to as an "HEV") in FIG. 1 presenting a block diagram related to the structure of the hybrid vehicle and the control executed therein, operates on motive power originating from a motive power source constituted with a motor generator (M/G1) 4. The motor generator 4 is a synchronous motor with a permanent magnet installed in a rotor thereof and the use of the term "motor generator" is justified since it is able to operate as a motor or a generator, depending upon the operating mode. The drive of the motor generator 4 is controlled as an inverter device 5 controls AC power supplied to an armature winding at a stator of the motor generator 4. A battery 6 is electrically connected to the inverter device 5 and power can be exchanged between the battery 6 and the inverter device 5. While the HEV in the embodiment is a front-wheel drive vehicle, in which the front wheels receive motive power from the motor generator and the rear wheels are free-rolling, the HEV may be a rear-wheel drive vehicle.

A front wheel axle is rotatably supported at the front of the body. A pair of front wheels 1 are mounted each at the two ends of the front wheel axle. A rear wheel axle (not shown) is rotatably supported at the rear of the body. A pair of rear wheels are mounted at the rear wheel axle, one at each of the two ends thereof.

A front wheel-side differential gear (hereafter referred to as a "front wheel-side DEF") 2 is disposed at the center of the front wheel axle. The front wheel axle is mechanically connected to the output side of the front wheel-side DEF 2. An output shaft of a transmission 3 is mechanically connected to the input side of the front wheel-side DEF 2. The front wheel-side DEF 2 is a differential motive power distribution mechanism that distributes the rotational drive force, transmitted thereto after the speed is adjusted via the transmission 3, to the left side and the right side of the front wheel axle. The output side of the motor generator 4 is mechanically connected to the input side of the transmission 3.

On the input side of the motor generator 8, a rotating shaft of a generator (hereafter referred to as a motor generator M/G 2) is mechanically connected to an output shaft of an engine 7. The dynamo electric generator 8 may be either a synchronous machine that includes a permanent magnet installed in the rotor thereof or an induction machine that does not include a magnet. As an inverter device 9 controls AC power supplied to the armature winding at the stator, the power generation is controlled and the battery 6 is charged with DC power output from the inverter device 9.

Figure 2:
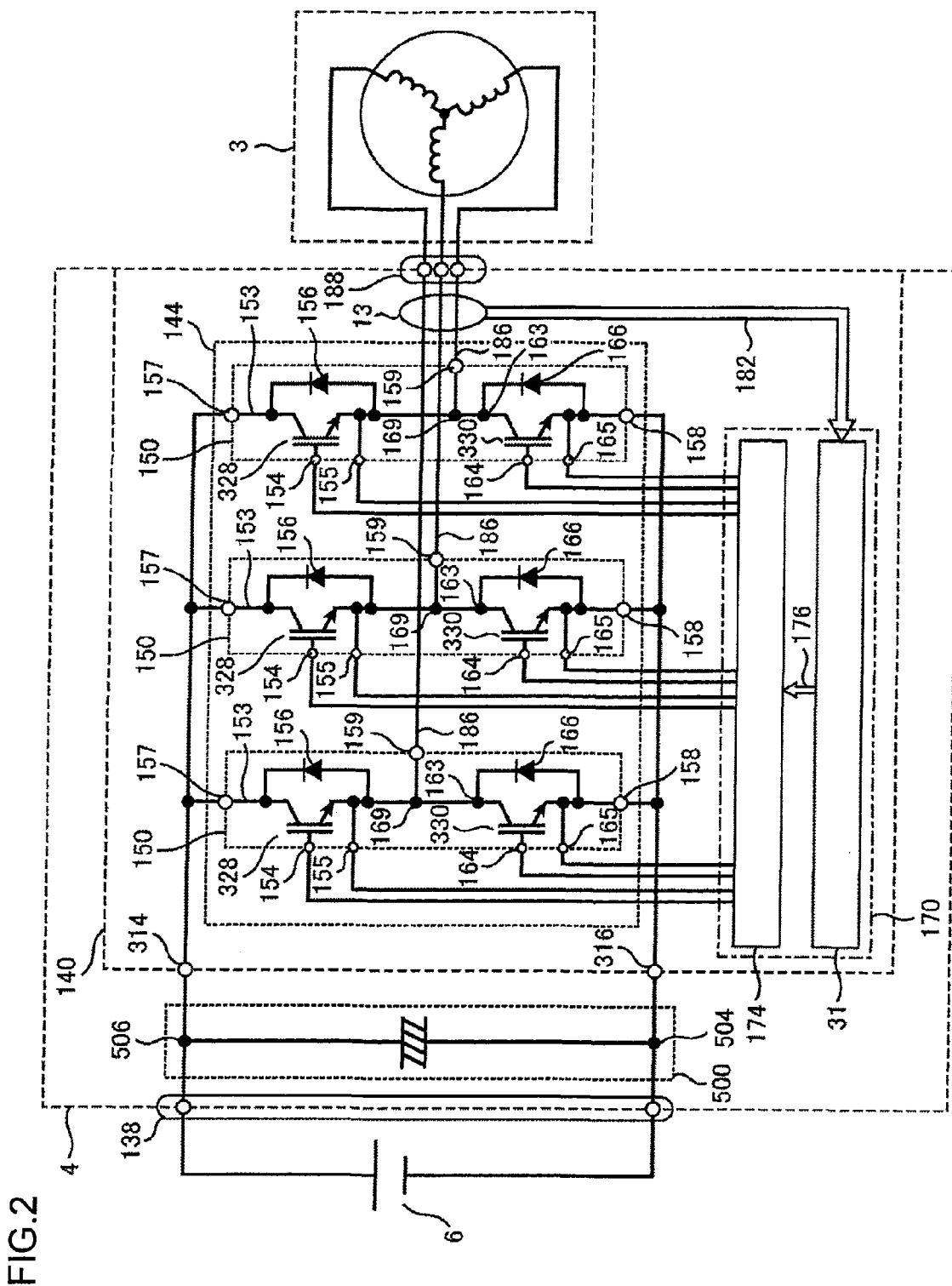
FIG. 2 is a circuit diagram showing the electric circuit structure adopted in the vehicle drive electro-mechanical system in FIG. 1.

Next, in reference to FIG. 2, the circuit structure of the inverter device 5 is explained.

The inverter device 5 in the embodiment includes an inverter circuit 144, a control unit 170 and a capacitor module 500. The inverter circuit 144 includes a plurality of upper/lower arm serial circuits 150, each constituted with an IGBT 328 (insulated gate bipolar transistor) and a diode 156 together engaged in operation to function as an upper arm and an IGBT 330 and a diode 166 together engaged in operation to function as a lower arm (the inverter circuit in the example presented in FIG. 2 includes three upper/lower arm serial circuit 150, 150 and 150). In addition, an area around the middle point (a middle electrode 169) at each upper/lower arm serial circuit 150 is connected to an AC power line (AC bus-bar) 186, which extends to the motor generator 4, through an AC terminal 159 at the upper/lower arm serial circuits. The control circuit 170 includes a driver circuit 174 that controls the drive of the inverter circuit 144 and a control circuit 31 that provides a control signal to the driver circuit 174 via a signal line 176.

The IGBTs 328 and 330, which respectively constitute part of the upper arm and the lower arm, are switching power semiconductor elements that are engaged in operation in response to a drive signal output from the driver circuit 174 and convert DC power supplied from the battery 6 to three-phase AC power. The power resulting from the conversion is supplied to the armature winding at the motor generator 4. The inverter device 5 is also capable of converting three-phase AC power generated via the motor generator 4 to DC power.

In the inverter circuit 144, adopting a three-phase bridge circuit structure, the upper/lower arm serial circuits 150, 150 and 150 corresponding to the three phases are electrically connected in parallel between a DC positive terminal 314 and a DC negative terminal 316, which are electrically connected respectively to the positive electrode side and the negative electrode side of the battery 6. An upper/lower arm serial circuit 150, which is referred to as an arm in this document, includes the upper arm-side switching power semiconductor element 328 and diode 156 and the lower arm-side switching power semiconductor element 330 and diode 166.

In the embodiment, the switching power semiconductor elements are constituted with the IGBT 328 and the IGBT 330. The IGBT 328 includes a collector electrode 153, an emitter electrode (signal emitter electrode terminal 155) and a gate electrode (gate electrode terminal 154), whereas the IGBT 330 includes a collector electrode 163, an emitter electrode (signal emitter electrode terminal 165) and a gate electrode (gate electrode terminal 164). The diodes 156 and 166 are electrically connected as shown in the figure, respectively between the collector electrode 153 and the emitter electrode at the IGBT 328 and between the collector electrode 163 and the corresponding emitter electrode at the IGBT 330. The diodes 156 and 166 each include two electrodes, i.e., a cathode electrode and an anode electrode, with the cathode electrodes electrically connected to the collector electrodes at the IGBTs 328 and 330 and the anode electrodes electrically connected to the emitter electrodes at the IGBTs 328 and 330 so as to set the direction running from the emitter electrode side toward the collector electrodes at the IGBTs 328 and 330 as the forward direction. Switching power semiconductor elements constituted with MOSFETs (metal oxide semiconductor field effect transistors) may be used instead. In such a case, the diodes 156 and 166 are not required.

Three upper/lower arm serial circuits 150 are provided, each in correspondence to one of the three phases assumed at the individual phase windings in the armature winding at the motor generator 4. The three upper/lower arm serial circuits 150, 150 and 150 respectively assume a U-phase, a V-phase and a W-phase relative to the motor generator 4, each via the middle electrode 169, which connects the emitter electrode at the IGBT 328 with the collector electrode 163 at the IGBT 330, and the AC terminal 159. The individual upper/lower arm serial circuits are electrically connected to each other in parallel. The collector electrodes 153 at the IGBTs 328 each constituting part of an upper arm are electrically connected (connected through a DC bus-bar) to a positive side capacitor electrode at the capacitor module 500 via respective positive terminals (P terminals) 157, whereas the emitter electrodes at the IGBTs 330 each constituting part of a lower arm are electrically connected (connected through a DC bus-bar) to a negative side capacitor electrode at the capacitor module 500 via respective negative terminals (N terminals) 158. The middle electrode 169 at the middle point (the point at which the emitter electrode of the upper-arm IGBT 328 and the collector electrode of the lower-arm IGBT 330 connect with each other) at each arm is electrically connected to the corresponding phase winding in the armature winding at the motor generator 4 via an AC connector 188.

The capacitor module 500 is used to form a smoothing circuit via which the extent of fluctuation of the DC voltage generated as the IGBTs 328 and 330 are engaged in switching operation is minimized. The positive electrode side of the battery 6 is electrically connected to the positive side capacitor electrode at the capacitor module 500 via a DC connector 138, whereas the negative electrode side of the battery 6 is electrically connected to the negative side capacitor electrode at the capacitor module 500 via the DC connector 138. As a result, the capacitor module 500, connected both between the collector electrodes 153 at the upper-arm IGBTs 328 and the positive electrode side of the battery 6 and between the emitter electrodes at the lower-arm IGBTs 330 and the negative electrode side of the battery 6, is electrically connected in parallel to the battery 6 and the upper/lower arm serial circuits 150. A relay unit 11 is present between the battery 6 and the inverter device 5, as shown in FIG. 1, and the battery 6 and the inverter device 5 are electrically disconnected from each other via the relay unit 11 in the event of an error.

The control unit 170, with control by which the IGBTs 328 and 330 are engaged in operation, includes the control circuit 31 that generates a timing signal to be used to control the switching timing for the IGBTs 328 and 330 based upon information input thereto from another control device, a sensor or the like and the drive circuit 174 that generates a drive signal to be used to engage the IGBTs 328 and 330 in switching operation based upon the timing signal output from the control circuit 31.

The control circuit 31 is equipped with a microcomputer that executes arithmetic operation processing to calculate the switching timing for the IGBTs 328 and 330. Information input to the microcomputer indicates a target torque value that the motor generator 4 is required to achieve, the value of the current supplied from the upper/lower arm serial circuits 150 to the armature winding at the motor generator 4 and the position of the magnetic pole at the rotor in the motor generator 4. Refer to FIG. 1 for specific details of the structure adopted in the control circuit 31.

The target torque value is obtained through the following process. Based upon information indicating the amount of pressing on an accelerator 16 operated by the driver and other values, a higher-order control device 17 outputs an acceleration/deceleration command value. A torque command unit 18 executes arithmetic operation to calculate a torque command value and current command values for the motor generator 4 by using a speed detection signal Vsp output from a speed detection unit 15 in the vehicle as feedback results. The torque command unit 18 calculates the torque command value and the current command values for the motor generator 4 also by using a magnetic pole position θ and an angular speed ω calculated via a magnetic pole position calculation unit 21 based upon a magnetic pole detection signal output from a rotating magnetic pole sensor 14 disposed in the motor generator 4 and by referencing information related to the battery 6, which is output by a battery controller 10 that detects the state of the battery 6. In addition, the current values at the motor generator 4 are converted at a three-phase/two-phase conversion unit 22 to a d-axis current command value and a q-axis current command value from the values indicated in current detection signals corresponding to the three phases U, V and W, output from current sensors 13. While current values corresponding to three phases are detected in the example presented in FIG. 1, current values corresponding to two phases may be detected, instead.

Based upon the target torque value provided from the torque command unit 18, a current control unit 19 calculates a d-axis current command value and a q-axis current command value for the motor generator 4, then calculates a d-axis voltage command value and a q-axis voltage command value based upon the differences between the d-axis and the q-axis current command values having been calculated and the d-axis and q-axis current detection values transmitted from the three-phase/two-phase conversion unit 22. A voltage command unit 20 converts the d-axis voltage command value and the q-axis voltage command value having been calculated in the current control unit 19 to a U-phase voltage command value, a V-phase voltage command value and a W-phase voltage command value based upon the magnetic pole position having been detected. Subsequently, a PWM generator 24 generates a modulated pulse wave by comparing a fundamental wave (sine wave) formed based upon the U-phase, V-phase and W-phase voltage command values with a carrier wave (triangular wave) and outputs the modulated wave thus generated as a PWM (pulse width modulation) signal to the driver circuit 174.

In order to drive a lower arm, the driver circuit 174 amplifies the PWM signal and provides a drive signal constituted with the amplified PWM signal to the gate electrode at the corresponding lower-arm IGBT 330. In order to drive an upper arm, the driver circuit 174 first shifts the level of the reference potential assumed by the PWM signal to the level of the upper arm reference potential, amplifies the PWM signal and outputs a drive signal constituted with the amplified PWM signal to the gate electrode at the corresponding upper-arm IGBT 328. In response to the drive signal input thereto, the IGBT 328 or 330 is engaged in switching operation.

Next, the coasting control executed while the hybrid vehicle is cruising at high speed is described. Topographical information 26 is provided from the higher-order side. The topographical information, which includes various types of information such as map information, road height/slope information and current vehicle position information, is primarily provided by a navigation system. An intermittent operation decision-making unit 27 makes a decision as to whether or not to allow the vehicle to coast, based upon the topographical information 26, the acceleration/deceleration command value output from the higher-order control device 17, the torque command value and the current command values for the motor generator 4 output from the torque command unit 18 and the information related to the battery 6 output from the battery controller 10. Once the vehicle is judged to be in a traveling state at a substantially steady speed and it is judged, based upon the topographical information 26, that the high-speed cruising state is likely to be sustained for a certain length of time, the vehicle may enter a coasting state.

When engaging the vehicle in coasting operation, a counter 28 is started up to store the number of times the intermittent operation is executed. Then, a three-phase shorting decision-making unit 29 makes a decision as to whether the three-phase shorting is to occur at the upper-arm IGBTs 328 or at the lower-arm IGBTs 330 in the inverter device. While the structure shown in FIG. 1 includes the counter 28 based upon the count value at which either the upper arms or the lower arms are alternately turned on each time the operation enters the three-phase shorting mode, the upper arms or the lower arms may be alternately turned on without using any counter. It is to be noted that the three-phase shorting operation will be described in detail in reference to FIGS. 3 and 4 later and that the explanation at this time focuses on the structure of the control circuit. Once the three-phase shorting decision-making unit 29 has determined the specific arms to be shorted, a switching element 25 disposed at a stage preceding the driver circuit 174 switches the gate signals from the PWM generator 24 to upper arm three-phase shorting signals or lower arm three-phase shorting signals. The signals resulting from the switchover drive the individual IGBTs in the inverter via the driver circuit 174.

The intermittent operation decision-making unit 27 stops the three-phase shorting operation and immediately issues an instruction to the motor generator 4 for torque output if, for instance, the driver steps on the accelerator 16 hard to indicate that he wishes to accelerate the vehicle or if the speed detection signal Vsp output from the speed detection unit 15 indicates a value lower than the target vehicle speed and thus the vehicle is judged to need to accelerate again. At this time, a voltage command calculation unit 30 generates a torque resumption command through arithmetic operation. This arithmetic operation is to be described in detail later in reference to FIG. 5. The torque resumption command is generated via the voltage command calculation unit 30 so as to minimize the extent of current fluctuation or torque fluctuation that is bound to occur when the vehicle in the three-phase shorting state reenters the motor accelerating state, by briefly reducing the output from the voltage command unit 20 immediately following resumption. The primary function of a switching unit 23 is to effect a brief switchover from the output from the voltage command unit 20 to the signal provided from the voltage command calculation unit 30 immediately after the resumption.

Next, the three-phase shorting operation is described. The voltage equations of a permanent magnet synchronous motor may be expressed as in equations (1) and (2) below.

$$Vd=(R+Lds)Id-\omega LqIq \quad (1)$$

$$Vq=\omega LdId+(R+Lqs)Iq+\omega\phi \quad (2)$$

Vd, Vq, Id, Iq, Ld, Lq, R, ω, Ø, t and s in the expressions above respectively represent; the d-axis voltage, the q-axis voltage, the d-axis current, the q-axis current, the d-axis inductance, the q-axis inductance, the winding resistance, the rotation angular speed, the magnetic flux quantity, the time and the differential operator.

Under the three-phase shorting conditions, in which either the upper-arm IGBTs or the lower-arm IGBTs corresponding to all the phases in the inverter device must be turned on, Vd=Vq =0 is true.

By applying the steady-state conditions (t=∞, s=0), expressions (1) and (2) can be rewritten as expressions (3) and (4) below.

$$0=RId-\omega LqIq \quad (3)$$

$$0=\omega LdId+RIq+\omega\phi \quad (4)$$

By solving equations (3) and (4) for the currents Id and Iq respectively, the following equations (5) and (6) are obtained.

$$Id = -\frac{\omega^2 \phi Lq}{\omega^2 LdLq + R^2} \quad (5)$$

$$Iq = -\frac{\omega\phi R}{\omega^2 LdLq + R^2} \quad (6)$$

The level I of the current can be calculated as expressed in (7) below based upon expressions (5) and (6).

$$I = \sqrt{\frac{\omega^2\phi^2(R^2 + \omega^2 Lq^2)}{(\omega^2 LdLq + R^2)^2}} \quad (7)$$

As long as the permanent magnet synchronous motor rotates at high speed, the resistance R can be disregarded and the current I converges toward the effective value expressed in (8) below.

$$\ldots (8)$$

$$I = \frac{\phi}{Ld} \quad (8)$$

Expression (8) above indicates that a constant current is held regardless of the rotation angular speed ω, at a value that is equivalent to the ratio of the magnetic flux quantity Ø and the d-axis inductance Ld, under the three-phase shorting conditions.

Figure 3:
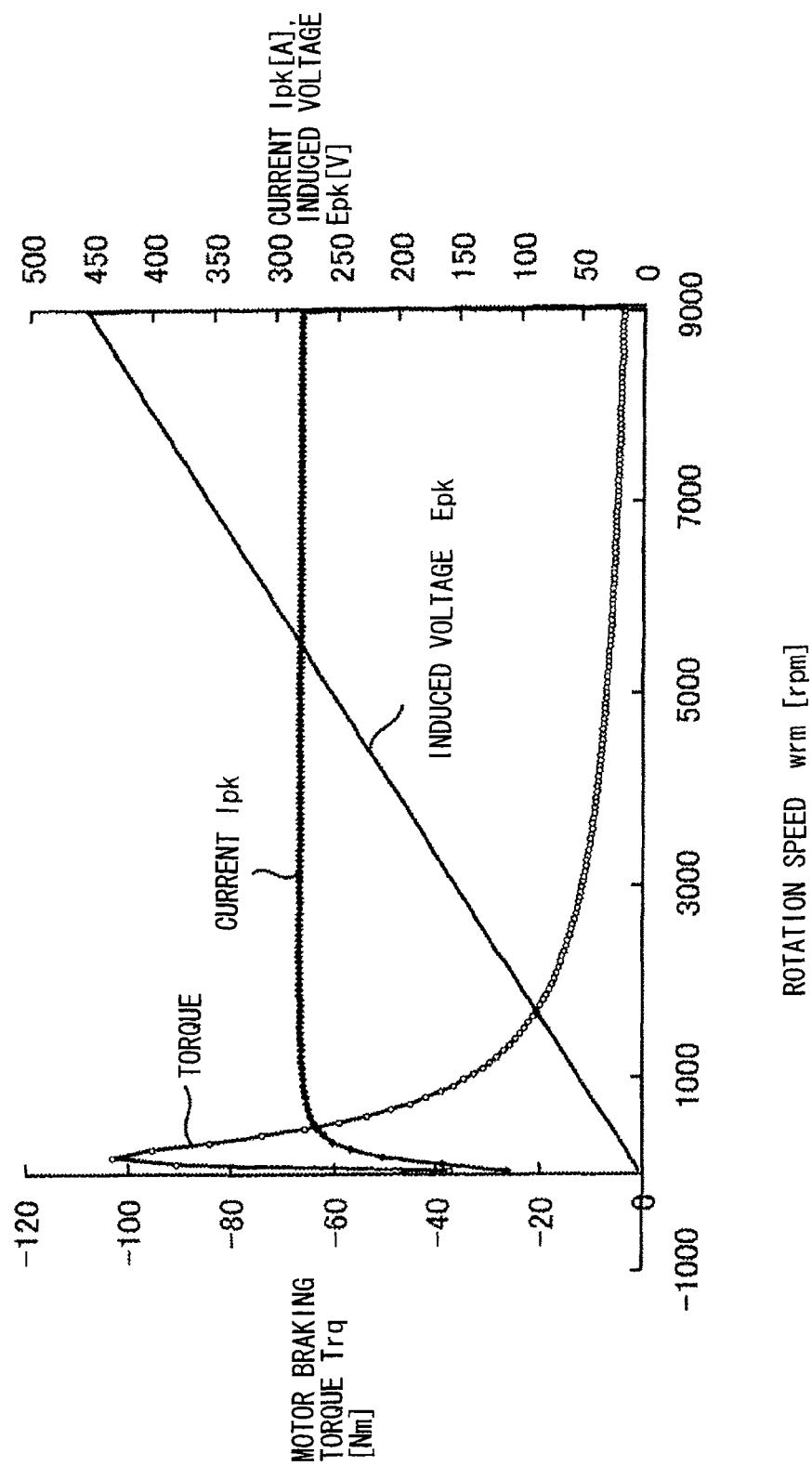
FIG. 3 presents a characteristics diagram indicating the change in the motor generator braking torque at the time of three-phase shorting, the change in the wave height value of the three-phase shorting current and the change in the induced voltage at the motor generator, all relative to a change in the rotating speed of the motor generator constituting the vehicle drive electro-mechanical system in FIG. 1.

FIG. 3 indicates the induced voltage Epk (wave height value) and the three-phase shorting current wave height value Ipk (obtained by converting the effective value calculated as expressed in (8) to a wave height value), both relative to the motor rotation speed ωrm and the motor braking torque Trq generated through the three-phase shorting operation. The induced voltage Epk increases linearly relative to the speed ωrm. The current wave height value Ipk, however, holds steady regardless of the speed ω.

The issue of torque is now examined. The drive torque is generated at the motor by supplying an electric current from the battery to the motor. Under the three-phase shorting conditions, however, a current supplied by using the induced voltage at the motor as a voltage source, circulates between the motor and the inverter. Since the current flows along the direction opposite from the direction along which the current flows to generate the drive torque, the torque generated under the three-phase shorting conditions is a braking force. For this reason, the three-phase shorting torque is notated as the motor braking torque in FIG. 3. The current Id calculated as expressed in (5) includes ω² in the numerator and increases by a factor of a power of two relative to the speed ω. The current Iq calculated as expressed in (6), on the other hand, includes ω in the numerator and thus, as the speed ω increases, Iq assumes an increasingly small value relative to the value of the current Id. While the torque at the permanent magnet motor contributes to the Id component as well as the Iq component, the torque is represented by the product of the Id component and the Iq component and thus, no torque is generated with the Id component alone, i.e., if the value of Iq is zero, no torque is generated. The exponential decrease of the motor braking torque relative to the speed corm indicated in FIG. 3 is caused by the much greater extent of decrease in Iq compared to Id. When the speed ω is equal to or higher than 5000 rpm, the torque is reduced to a level equal to or less than ¹⁄₁₀ of the torque −100 Nm detected at an extremely low speed and thus, the vehicle is subjected to only a very slight braking force. The object of the embodiment is to enable the vehicle to sustain a traveling state with inertial force by intermittently executing the three-phase shorting operation while the vehicle is cruising at high speed and turning off the current supply from the battery during each three-phase shorting period, the braking force generated during which is not significant enough to affect the vehicle traveling condition.

Figure 4:
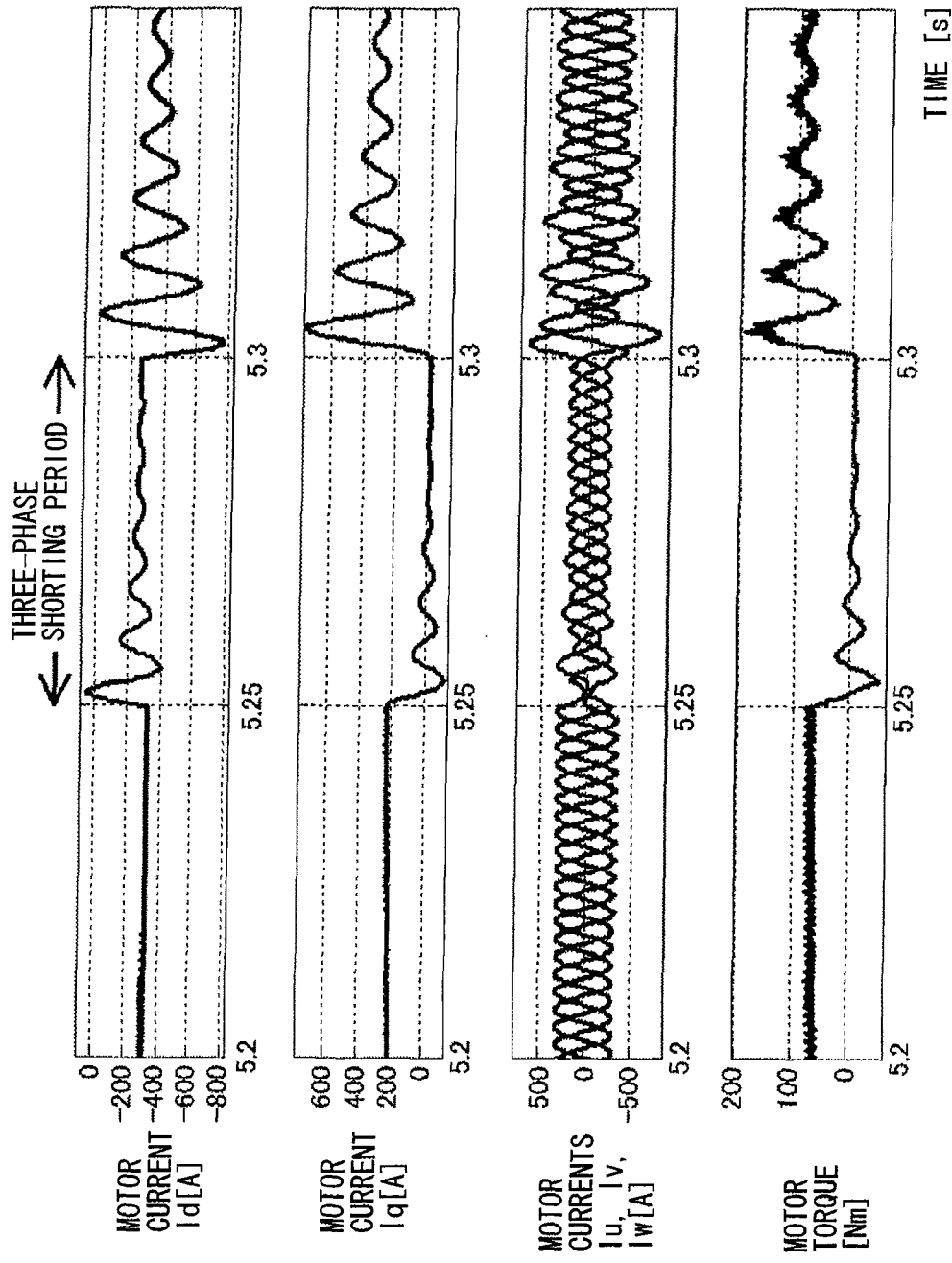
FIG. 4 presents waveform diagrams of changes continuously occurring over time as the motor is driving, the motor enters three-phase shorting (coasting state) and subsequently the motor is returned to driving (accelerating state), in the wave forms obtained by measuring the electrical currents (d-axis and q-axis currents and the u-phase, v-phase and w-phase currents) and the torque at the motor generator constituting the vehicle drive electro-mechanical system in FIG. 1.

FIG. 4 presents the operational waveforms of the motor torque and the current components measured during the actual three-phase shorting period. The motor currents Id, Iq, Iu, Iv and Iw in FIG. 4 are all currents at the motor (hereafter the motor generator 4 in FIG. 1 is simply referred to as the motor) and Iu, Iv and Iw in the diagram presented in the middle of FIG. 4 are the currents in the U-phase, the V-phase and the W-phase respectively. In addition, the waveforms of the currents Id and Iq were obtained as the three-phase components Iu, Iv and Iw were converted at the three-phase/two-phase conversion unit 22 to two-phase components along the d- and q-axes. The waveforms were measured by executing the three-phase shorting operation during the period of time elapsing between a 5.25 (sec) time point through a 5.3 (sec) time point and resuming the motor drive at the 5.3 (sec) time point.

FIG. 4 indicates that while the currents began to fluctuate immediately after the start of the three-phase shorting operation, they all settled to assume steady values after approximately 0.02 seconds. In the steady-state, Id assumed a value of −150 A, Iq assumed a value substantially equal to zero and the torque assumed the value of 0. Then, as the motor drive resumed at the 5.3 (sec) time point, all the motor currents Id, Iq, Iu, Iv and Iw began to fluctuate, which caused the torque to assume an fluctuating state. These results indicate that it is crucial to effectively suppress the extent of torque fluctuation occurring as the drive is resumed following the three-phase shorting operation, in order to optimize the intermittent execution of the three-phase shorting operation.

Figure 5:
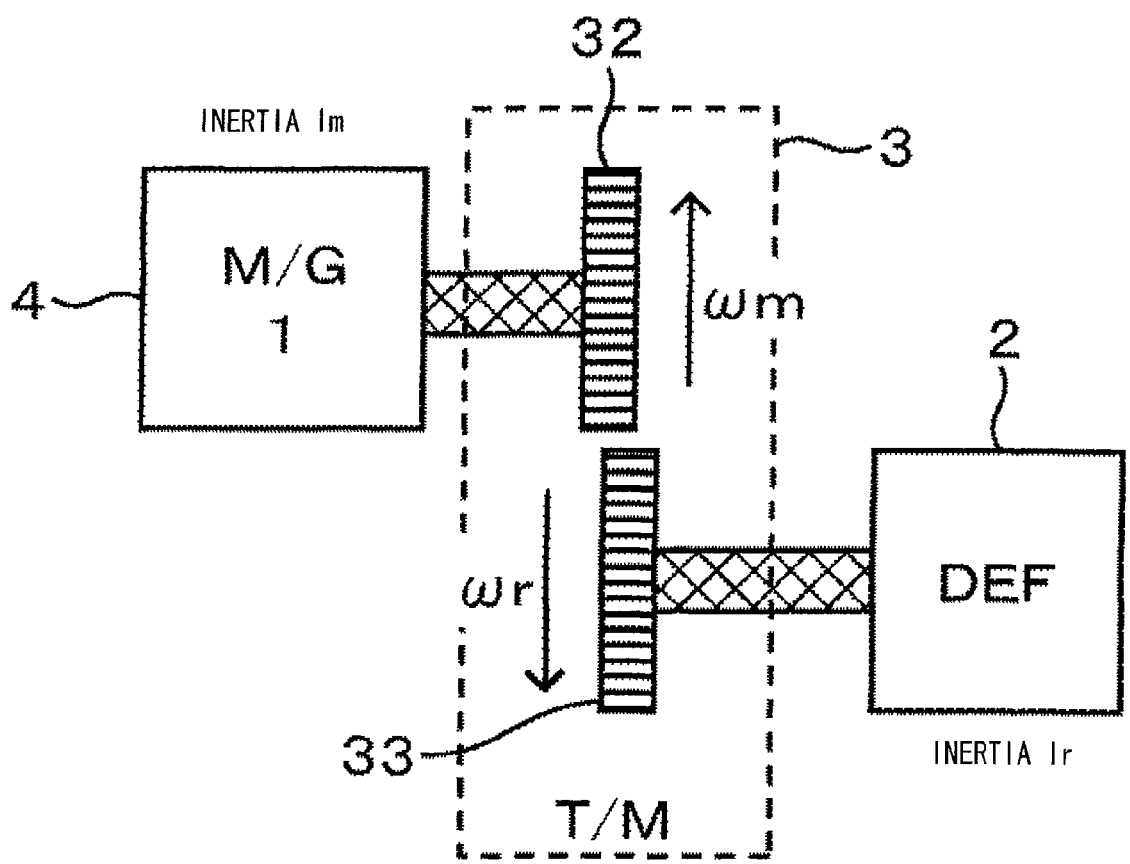
FIG. 5 illustrates how the motor generator, the transmission and the differential gear constituting the vehicle drive electro-mechanical system in FIG. 1 are mechanically connected.

In reference to FIG. 5, a method for suppressing the torque fluctuation occurring as drive is resumed following the three-phase shorting operation, achieved by taking into consideration the inertia in the mechanical system, is described. FIG. 5 illustrates how the motor generator 4, the transmission 3 and the differential gear 2 in FIG. 1 are mechanically connected. For purposes of simplification, the figure shows a transmission 3 assuming a primary structure constituted with a set of gears, with k representing the gear ratio. An equation of motion applicable to this structure may be as indicated in (9) below.

$$\left(I_m + \frac{I_r}{\eta k^2}\right)\frac{d\omega_m}{dt} = T_m - \frac{T_r}{\eta k} \qquad (9)$$

Im, Ir, η, Tm, Tr and ωm in the expression above respectively represent; the motor inertia, the load inertia at the transmission and the differential gear, the gear efficiency, the gear ratio, the motor torque, the load torque at the transmission and the differential gear and the angular speed at the motor.

The load torque may be calculated as expressed in (10) below based upon the vehicle traveling conditions, the friction at the road surface and the slope.

$$T_r = \frac{r_w}{\lambda_a}\left(Rs + Rr + Ra + m\frac{dv}{dt}\right) \qquad (10)$$

λa, m, v, rw, Rs, Rr and Ra in the expression above respectively represent; the total transmission gear ratio, the vehicle weight, the vehicle speed, the tire radius, the slope resistance, the rolling resistance and the aerodynamic resistance.

The differential equation, applicable in the resumption of motor drive following the three-phase shorting operation, is solved for ωm by incorporating expression (10) in expression (9) for substitution. Under the initial conditions, the motor torque assumes the value of 0 during the three-phase shorting operation and the motor angular speed assumes a value determined in correspondence to the speed of the vehicle in a coasting state. In order to minimize the extent of vibration occurring as the motor drive is resumed following the three-phase shorting operation, the motor torque should be generated so as to substantially equalize the motor angular speed following the resumption of the drive with the motor angular speed prior to the resumption. Expression (11) is obtained by solving the differential equation with the motor angular speed held at a steady value.

$$T_m = 2\frac{1}{\eta k}\frac{r_w}{\lambda_a}(Rs + Rr + Ra) \qquad (11)$$

Figure 6:
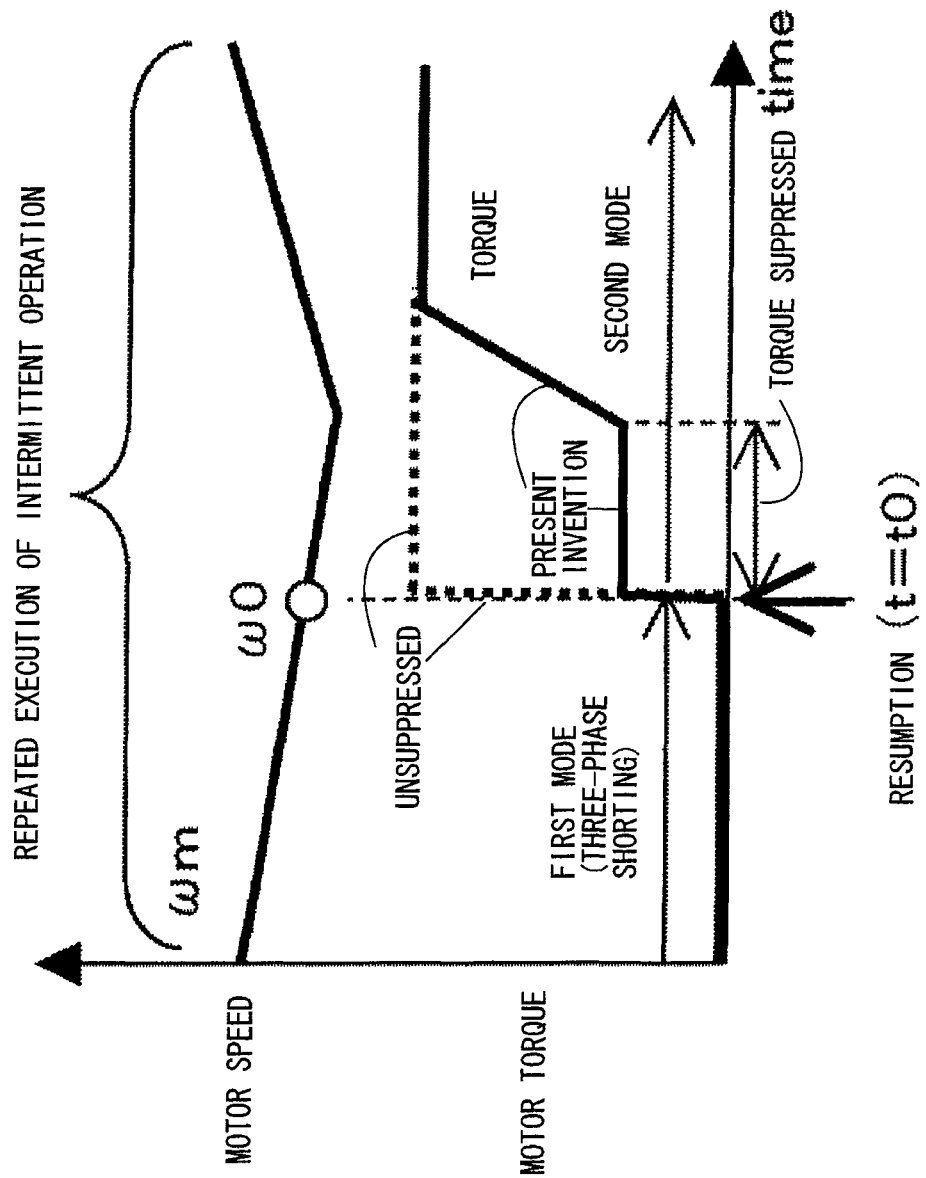
FIG. 6 schematically illustrates how torque is suppressed through the three-phase shorting state (coasting state) and the subsequent motor drive resumption (accelerating state) in FIG. 4.
Figure 7:
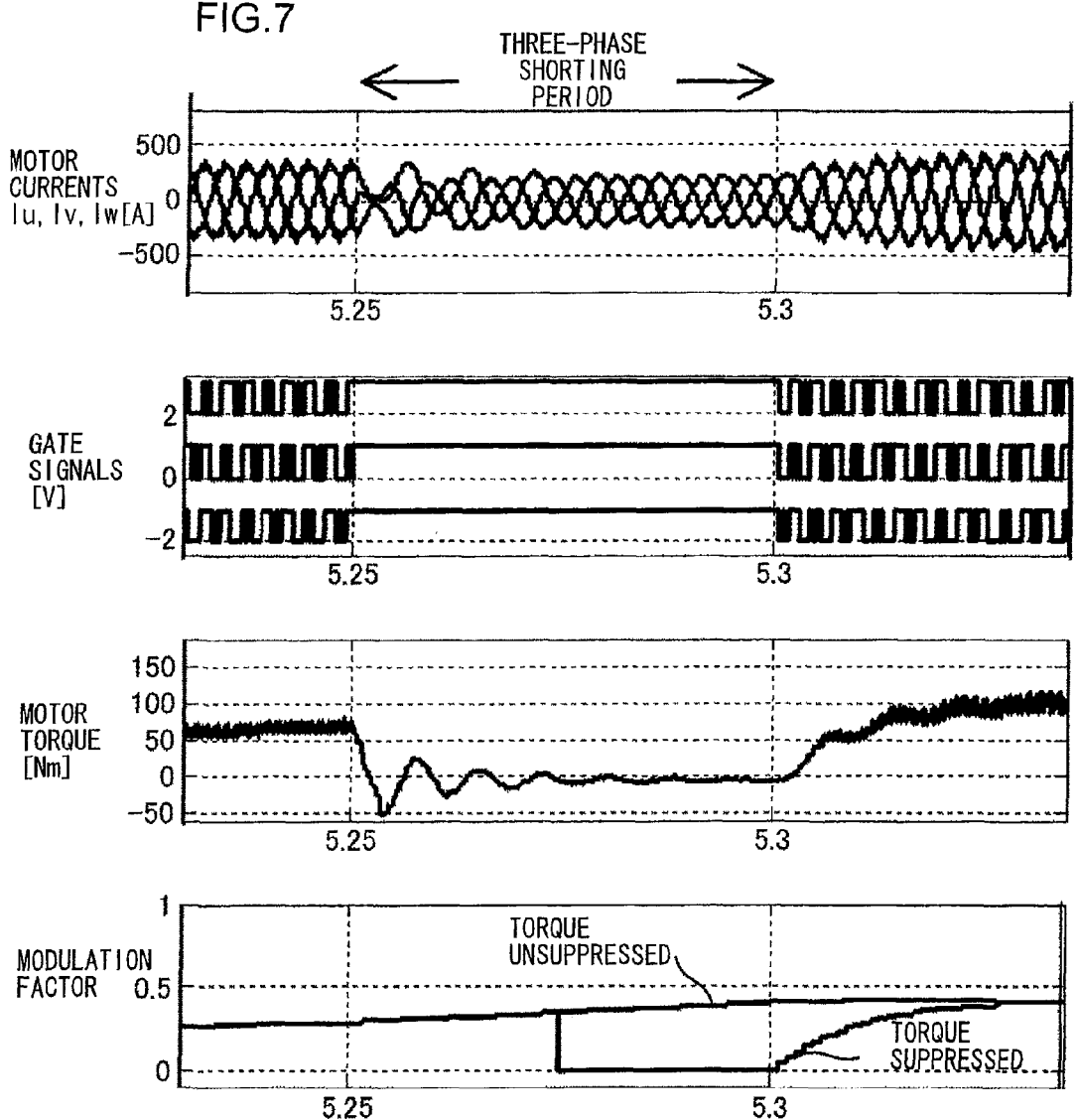
FIG. 7 presents waveform diagrams in reference to which the advantages of the torque suppression method illustrated in FIG. 6 is explained, indicating changes occurring over time in the currents (u-phase, v-phase and w-phase currents) at the motor generator constituting the vehicle drive electro-mechanical system in FIG. 1, in the motor generator torque, in the gate signals used to drive the switching semiconductor elements in the inverter device constituting the vehicle drive electro-mechanical system in FIG. 1 and the modulation factor corresponding to a single-phase modulation adopted as the switching method when switching the switching semiconductor elements in the inverter device.

The embodiment is characterized in that when the vehicle in the coasting state reenters an accelerating state, the motor torque is first briefly controlled in conformance to the value determined as expressed in (11) instead of immediately responding to the acceleration command generated based upon the amount of pressing on the accelerator shown in FIG. 1, and then the vehicle is accelerated as instructed by the driver. This function is equivalent to the operation executed in the voltage command calculation unit 30 in FIG. 1. FIG. 6 schematically illustrates how the torque is regulated at the time of drive resumption. As the dotted line in the figure indicates, if torque was generated in conformance to the acceleration instruction issued by the driver at the time of drive resumption, current fluctuation and torque fluctuation would occur as has been explained in reference to FIG. 4. FIG. 7 presents the results of the torque suppression executed at the time of drive resumption, as shown in FIG. 6. The motor currents Iu, Iv and Iw and the motor torque were calculated under conditions matching those under which the values indicated in FIG. 4 were calculated. FIG. 7 also indicates the gate signals at the inverter upper arms 328. The lower arm signals, which are not shown, are complementary to the upper arm signals and accordingly, when the upper arm signals indicate a value of 1 (i.e., H), the lower arm signals indicate a value of 0 (i.e., L). The modulation factor indicating the level of torque output is determined through a comparison with the triangular wave at the PWM generation unit 24 in response to a voltage command 20 in FIG. 1 and a modulation factor of 1 is equivalent to the maximum output. While values such as those presented in FIG. 4 would be observed if no torque suppression was executed at the time of drive resumption, the motor torque or the currents do not fluctuate if the torque is controlled as shown in FIG. 7. While FIG. 6 shows the period of time during which the torque is briefly regulated in a stage and a period of time during which the torque increases over time, the operation does not need to include any staged period and may simply include the period of time during which the torque increases over time, as shown in FIG. 7.

As long as no vibration occurs at the resumption of the torque output state following the three-phase shorting operation executed in the coasting state, the vehicle can be allowed to readily enter the coasting state while it cruises at high speed so as to minimize the power supply from the battery, without the driver in the coasting vehicle having to experience any discomfort. As explained earlier, there is a concern that the three-phase shorting operation is likely to induce overheating at the motor and the inverter and for this reason, the three-phase shorting operation is executed only intermittently so as not to sustain the motor and the inverter in a heated state.

Figure 8:
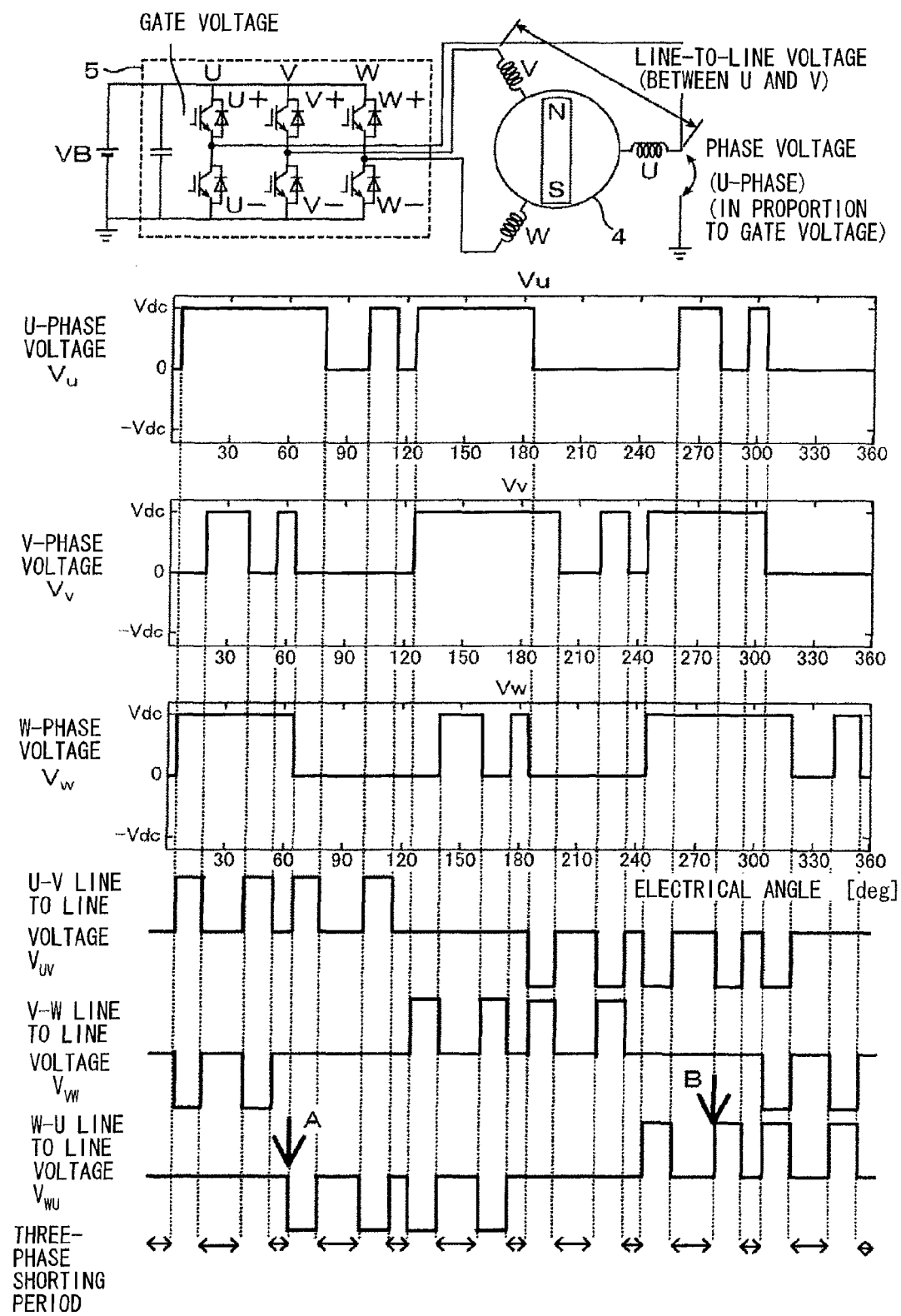
FIG. 8, in reference to which a control method that may be adopted when alternating the three-phase shorting and the single-phase modulation as ways of switching the switching semiconductor elements in the inverter device constituting the vehicle drive electro-mechanical system in FIG. 1 is described, shows the electric circuit structure adopted in the inverter device and the motor generator and the waveforms indicating changes in the electrical angles of the voltages in the u-phase, v-phase and w-phase and the voltages between the u and v lines, between the v and w lines and between w and u lines.

Next, the aspect of the present invention related to optimal motor control under which the vehicle is allowed to coast in an ideal manner in the three-phase shorting mode is described. FIG. 8 shows the feature characterizing this control method. With Vu, Vv and Vw in FIG. 8 representing the outputs from the inverter 5 in the various phases, a state in which the values of the individual phase outputs Vu, Vv and Vw are all equal to one another at Vdc or 0 occurs in correspondence to every other pulse. It is to be noted that the electrical angle is indicated along the horizontal axis in FIG. 8, with the 0 through 360° range corresponding to a single electrical cycle. When the outputs corresponding to the individual phases all indicate Vdc, a three-phase shorting state is achieved with all the upper arms in the inverter 5 turned on, whereas when the outputs corresponding to the individual phases all indicate 0, a three-phase shorting state is achieved with all the lower arms in the inverter 5 turned on. The waveforms of the line-to-line voltages Vuv, Vvw and Vwu, representing the differences between the individual phase outputs Vu, and Vv, between the phase outputs Vv and Vw and between the phase outputs Vw and Vu, and assuming the pulse form indicated in FIG. 8, are offset by 120° relative to one another, which is a characteristic feature of three-phase AC power. As these voltages are applied to the windings at the motor 4, the currents will circulate in the three-phase shorting pattern even while the line-to-line voltage pulses are in the off state and thus, the currents form smoothed three-phase sine-wave AC power.

Under the control illustrated in FIG. 8, the current supply from the battery to the motor is turned off in conformance to the three-phase shorting pattern and then as a specific phase among the U-phase, the V-phase and the W-phase enters a switched state different from the state at the other two phases (e.g., the upper arms are turned on in the U-phase and the W-phase and the lower arm is turned on in the V-phase), a current is supplied from the battery to the motor. The output is controlled based upon the width of the pulse corresponding to the particular phase. In other words, under the control illustrated in FIG. 8, a single-phase modulation mode in which the current is supplied from the battery to the motor and the three-phase shorting mode in which the current supply is turned off are alternately assumed.

Figure 9:
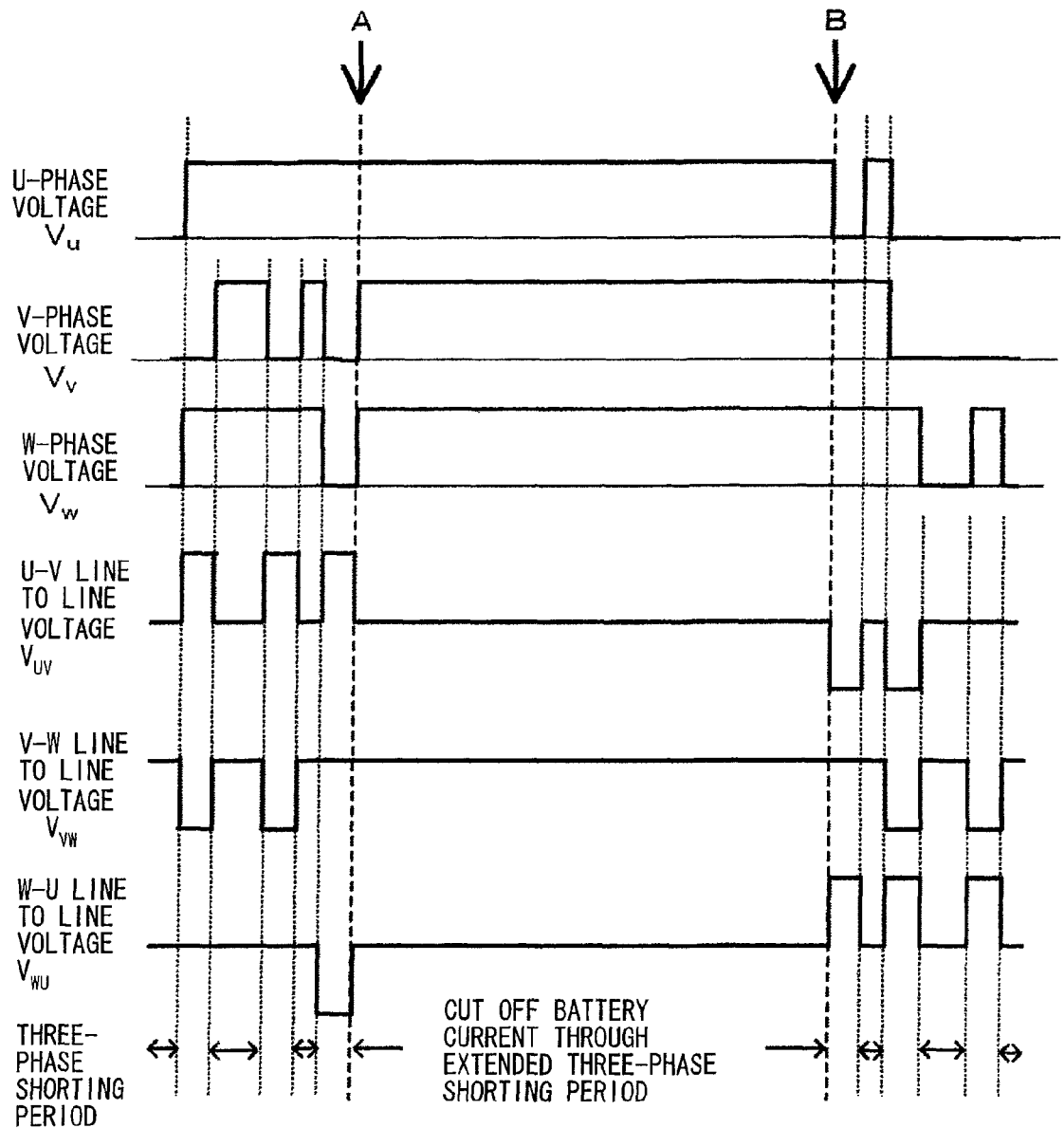
FIG. 9 presents waveform diagrams of the waveforms indicating changes in the electrical angles of the voltages in the u-phase, v-phase and the w-phase and the voltages between u and v lines, between v and w lines and between w and u lines, occurring as three-phase shorting operation (coasting) is executed over the A-B block in FIG. 8.

FIG. 9 shows the signal pattern assumed as a coasting operation is executed over the time period elapsing from A through B in FIG. 8. The three-phase shorting mode in which the upper arms in the individual phases are turned on is sustained over the period elapsing from A through B in FIG. 9. In FIG. 9, the three-phase shorting state is sustained over a longer period of time compared to the three-phase shorting period achieved under the control shown in FIG. 8 without engaging the vehicle in a coasting operation over the period A through B. In this control method, the single-phase modulation mode and the three-phase shorting mode are alternately assumed and thus, even as the motor drive is resumed following the longer three-phase shorting period (A through B) as shown in FIG. 9, the operation can be executed based upon a simpler control algorithm by recognizing the resumption point B based upon the electrical angle and restoring the signal pattern in FIG. 8 corresponding to the particular angle.

The waveforms in FIG. 7 having been described earlier indicate the results obtained by executing the control in FIG. 9. The torque suppression executed immediately after the resumption (following the 5.3 (sec) time point in FIG. 7) described in reference to FIG. 7 is achieved by briefly lowering the modulation factor for the single-phase modulation to zero and then slowly increasing the torque over a predetermined range (until the modulation factor assumes a value approximately equal to 0.45 in FIG. 7).

While the three-phase sine wave alternating current flows without problem except for during the three-phase shorting period in FIG. 7, no current fluctuation occurs as the single-phase modulation mode is switched to the three-phase shorting mode or vice versa. Namely, the pulse width representing a three-phase shorting period occurring after a single-phase modulation period when the motor is not in the coasting state (elapsing from the 5.25 (sec) point through the 5.3 (sec) point in FIG. 7) indicates that the three-phase shorting period lasting over a smaller length of time, ends while the current is still in the transient state before settling down to assume the steady value indicated in expression (8) and thus, the three-phase sine wave can be maintained intact.

While the coasting operation, during which the three-phase shorting mode is assumed intermittently, has been described so far, the intermittent operation decision-making unit 27 in FIG. 1 makes a decision as to whether or not to interrupt the coasting operation with the three-phase shorting mode by factoring in the topographical information 27 as explained earlier. This point is further examined in reference to the load torque calculated as expressed in (10). The slope resistance Rs in expression (10) is in proportion to $\sin \theta$ with $\theta$ indicating the angle of inclination at the road surface. In addition, the rolling resistance Rr is in proportion to the product of $\cos \theta$ with $\theta$ indicating the angle of inclination and the coefficient of friction at the road surface. Namely, when the angle of inclination $\theta$ is greater, the slope resistance Rs assumes a greater value but the rolling resistance Rr assumes a smaller value. When the road is flat, the rolling resistance Rr, which changes mainly in correspondence to the coefficient of friction at the road surface, assumes a small value. In addition, the aerodynamic resistance Ra is in proportion to the square of the vehicle speed relative to the airspeed.

When the load torque, calculated as expressed in (10), assumes a large value, the vehicle speed is bound to decrease during the execution of intermittent operation according to the present invention. In the embodiment, the intermittent operation decision-making unit 27 automatically makes a decision to enter the coasting state and the coasting operation starts accordingly even if the driver performs no operation to initiate a coasting operation while the vehicle is cruising at high speed with a small load torque. It is to be noted that although not included in the illustration in FIG. 1, the electromechanical system further includes a temperature detection unit that detects the temperature of the motor generator 4 and provides a temperature detection signal to the intermittent operation decision-making unit 27. If the temperature at the motor generator 4 indicated by the temperature detection signal exceeds a threshold value, the intermittent operation decision-making unit 27 decides to disallow the three-phase shorting mode for intermittent operation.

In addition, when executing the three-phase shorting operation intermittently, the upper arms or the lower arms corresponding to all the phases are turned on at once, as has been described earlier. If the arms on a given side are repeatedly turned on each time the three-phase shorting operation is executed, the inverter in a specific phase is bound to become overheated due to loss. Accordingly, it is more desirable to switch arms to be turned on for three-phase shorting after each interval.

As has been explained in reference to expressions (5) and (6), the current components Id and Iq change differently relative to the speed ω during the three-phase shorting period. A similar tendency is observed with regard to the changes in the current components Id and Iq prior to the three-phase shorting operation, indicating that when Id is considerably greater than Iq, the vehicle is traveling at high speed and that when Iq assumes a small value, no accelerating torque is required and the vehicle is in a cruising state. For this reason, the ratio of Id and Iq can be used as an effective indicator based upon which a decision is made as to whether or not to execute the intermittent operation.

While the explanation has been given in reference to FIG. 1 on an example in which a decision is made as to whether or not to start the intermittent operation in the vehicle, which then automatically enters a coasting state, the driver, having made a decision similar to that made by the intermittent operation decision-making unit 27, may perform a specific operation to set the vehicle in a coasting state.

In an representative aspect of the present invention, a motor control device through which energy saving can be achieved and a motor system equipped with the motor control device are provided.

In the aspect of the present invention, power consumption attributable to the motor being driven can be reduced and thus, energy efficiency can be achieved.

The above described embodiment is an example and various modifications can be made without departing from the scope of the invention.

What is claimed is:

1. A motor system comprising:
a motor that is driven on power supplied thereto and generates a drive force to be used to drive a drive target body; and
a control device that controls drive of the motor by controlling and supplying the power, which is supplied from a power source of the motor and is controlled by the control device, to the motor, wherein:
the control device intermittently interrupts the power supplied to the motor;
the control device converts DC power to AC power by engaging a plurality of switching semiconductor elements in switching operation, and comprises a switching circuit constituted with a plurality of serial circuits each formed by electrically connecting in series an upper-arm switching semiconductor element and a lower-arm switching semiconductor element, which are electrically connected in parallel to the power source;
the motor includes a plurality of input terminals through which the AC power is input;
the plurality of serial circuits are disposed corresponding to the plurality of input terminals, respectively;
a middle point between the upper-arm switching semiconductor element and the lower-arm switching semiconductor element in each of the plurality of serial circuits is electrically connected to a corresponding input terminal among the plurality of input terminals;
the power for driving the motor is cut off by setting all upper-arm switching semiconductor elements or all lower-arm switching semiconductor elements in the plurality of serial circuits in an electrically continuous state at once and thus setting the plurality of input terminals in an electrically shorted state;
the power for driving the motor is cut off by forming a first operation mode, in which the plurality of input terminals of the motor are in an electrically shorted state by setting all upper-arm switching semiconductor elements or all lower-arm switching semiconductor elements in the plurality of serial circuits in an electrically continuous state at once with predetermined electrical angle timing relative to a single cycle of an AC current output from the control device; and
a second control mode, in which controls are done for operation of the power conversion circuit, is formed, wherein, among upper- and lower-arm switching semiconductor elements in one of the plurality of serial circuits, a switching semiconductor element of an arm which is different from a switching semiconductor element of other serial circuits and of being in an electrically continuous state is set in an electrically continuous state according to an predetermined order of serial circuits, and wherein an amplitude of AC current output from the control device is modified in correspondence to a length of time of the electrically continuous state, and the first control mode and the second control mode are alternately assumed.

2. A motor system according to claim 1, wherein: when the shorted state is sustained over a length of time equal to or greater than a single cycle of the AC current output from the control device, upper-arm switching semiconductor elements or lower-arm switching semiconductor elements are set in an electrically continuous state after each intermittence in an alternating pattern.

3. A motor system, comprising:
a power conversion unit supplying AC power in 3-phases, which includes a plurality of serial circuits each formed by electrically connecting in series an upper-arm switching semiconductor element and a lower-arm switching semiconductor element, which are electrically connected in parallel to the power source;
a motor including a plurality of input terminals through which the AC power in 3-phases is supplied;
a control unit that controls the AC power supply to the motor, wherein:
the control unit controls the AC power supply to the motor by switching between a first operation mode and a second operation mode;
in the first operation mode the AC power supply is cut off by setting either all upper-arm switching semiconductor elements or all lower-arm switching semiconductor elements to be electrically continuous at once with predetermined electrical angle timing relative to a single cycle of an AC current output from the control unit;

in the second operation mode an upper-arm switching semiconductor element and a lower-arm switching semiconductor element for one of the 3-phases are operated respectively to be on/off and off/on, while other upper-arm switching semiconductor elements and lower-arm switching semiconductor elements for other two of the 3-phases are operated respectively to be off/on and on/off in a reversed manner to be switching semiconductor elements of the one of the 3-phases; and an AC power supplied to the motor is controlled by a time duration of the first operation mode and a time duration of the second operation mode.

4. A motor system according to claim 3, wherein: when a time duration of the first operation mode becomes longer than 360° electrical angle, either upper-arm switching semiconductor elements or lower-arm switching semiconductor elements are set in an electrically continuous state in an alternating pattern each time after carrying out a second operation mode.

5. A motor system comprising:

a power conversion unit having switching devices connected as a three-phase inverter circuit and a control unit that controls on or off-states of the switching devices to supply AC current to a motor through a power source, wherein:

the control unit makes a first operation mode and a second operation mode alternatively to supply the AC current intermittently;

the first operation mode, in which all of the terminals of the motor are in an electrically shorted state by setting on-state of all upper or all lower of the switching devices connected as the three-phase inverter circuit at once with predetermined electrical angle timing relative to a single cycle of an AC current output from the control unit;

the second operation mode, in which the inverter supplies the AC current through the power source by changing an upper and a lower switching devices of one phase of the three-phases inverter circuit opposite state compared with the first operation mode, and remaining the same states of other two phase of the three-phase inverter circuit; and an amplitude of the AC current is modified by time lengths of the first operation mode and the second operation mode.

6. A motor system according to claim 5 wherein: the control unit continues the first operation mode longer than 360° electrical angle, setting either upper-arm switching semiconductor elements or lower-arm switching semiconductor elements to be electrically continuous in an alternating manner after each time carrying out the second operation mode.

* * * * *